US008000014B2

(12) United States Patent
Whitehead et al.

(10) Patent No.: US 8,000,014 B2
(45) Date of Patent: Aug. 16, 2011

(54) ADAPTIVE SUNLIGHT REDIRECTOR

(75) Inventors: Lorne A. Whitehead, Vancouver (CA); Jon David Edward Scott, Vancouver (CA)

(73) Assignee: The University of British Columbia, Vancouver, British Columbia (CA)

( * ) Notice: Subject to any disclaimer, the term of this patent is extended or adjusted under 35 U.S.C. 154(b) by 0 days.

(21) Appl. No.: 12/665,103

(22) PCT Filed: Jun. 16, 2008

(86) PCT No.: PCT/CA2008/001144
§ 371 (c)(1),
(2), (4) Date: Dec. 17, 2009

(87) PCT Pub. No.: WO2009/000070
PCT Pub. Date: Dec. 31, 2008

(65) Prior Publication Data
US 2010/0254010 A1   Oct. 7, 2010

Related U.S. Application Data

(60) Provisional application No. 60/945,653, filed on Jun. 22, 2007.

(51) Int. Cl.
*G02B 17/00* (2006.01)
*G02B 27/00* (2006.01)
*G02B 5/08* (2006.01)
*G02B 7/182* (2006.01)

(52) U.S. Cl. ........ 359/592; 359/596; 359/853; 359/855; 359/876

(58) Field of Classification Search .......... 359/592–593, 359/596–597, 853, 855, 876; 126/569
See application file for complete search history.

(56) References Cited

U.S. PATENT DOCUMENTS

| 4,056,313 | A |   | 11/1977 | Arbogast |
| 4,110,010 | A | * | 8/1978  | Hilton ............................. 359/853 |
| 4,129,360 | A |   | 12/1978 | Deflandre et al. |

(Continued)

FOREIGN PATENT DOCUMENTS

CN   1630798 A   6/2005

(Continued)

OTHER PUBLICATIONS

"A New Device for Distributing Concentrated Sunlight in Building Interiors", Whitehead et al., Energy and Buildings 6 (1984) pp. 119-125.

(Continued)

*Primary Examiner* — Christopher Mahoney
(74) *Attorney, Agent, or Firm* — Oyen Wiggs Green & Mutala LLP

(57) ABSTRACT

Longitudinally adjacent plane mirrors (106-114) are pivotally interconnected in a columnar array (56) by non-stretching linkages (120) which constrain movement of the mirrors such that their normal vectors (115) remain parallel. Pivotable couplings (122, 124) in two mirrors permit movement of the mirrors with respect to mutually perpendicular axes (x, y) and prevent movement of the mirrors with respect to a third axis (z). Two actuators (117A, 117B) coupled to one of the pivotable couplings controllably move a selected mirror with respect to the mutually perpendicular axes (x, y). A first frame (116) couples the mirror columns together so that movement of the selected mirror moves all the mirrors in unison. The actuators controllably move the mirrors to orient the normal vectors such that the mirrors specularly reflect incident light in a preselected direction.

13 Claims, 7 Drawing Sheets

U.S. PATENT DOCUMENTS

| | | | |
|---|---|---|---|
| 4,284,061 A | | 8/1981 | Wildenrotter |
| 4,425,904 A * | | 1/1984 | Butler ........................ 126/606 |
| 4,466,423 A * | | 8/1984 | Dolan et al. ................ 126/571 |
| 4,883,340 A | | 11/1989 | Dominguez |
| 5,787,878 A | | 8/1998 | Ratliff, Jr. |
| 5,980,052 A * | | 11/1999 | Thor et al. ................... 359/877 |
| 2009/0314325 A1 * | | 12/2009 | Borton ........................ 136/246 |

FOREIGN PATENT DOCUMENTS

| | | |
|---|---|---|
| JP | 07105708 A2 | 4/1995 |
| KR | 10-2000-74065 | 5/2000 |
| WO | 02/070966 A1 | 9/2002 |

OTHER PUBLICATIONS

"Air-clad optical rod daylighting system", Callow et al., Lighting Res. Technol. 35,1 (2003) pp. 31-38.

"Analysis of a full spectrum hybrid lighting system", Schlegel et al., Solar Energy 76 (2004) pp. 359-368.

"A Cost-Effective Approach to Core Daylighting", Whitehead et al., 2nd Canadian Solar Buildings Conference, Calgary, Jun. 10-14, 2007, pp. 1-6.

"Lightpipe applications for daylighting systems", Rosemann et al., Solar Energy 78 (2005) pp. 772-780.

"On the energy efficiency of a prototype hybrid daylighting system", Tsangrassoulis et al., Solar Energy 79 (2005) pp. 56-64.

"A Cost-Effective Solution for Core Daylighting in Office Buildings", Rosemann et al., American Solar Energy Society Solar Conference, 2006, pp. 1-6.

"Test room measurements and computer simulations of the micro-light guiding shade", Greenup et al., Solar Energy 76 (2004) 99-109.

English translation of Feb. 23, 2011 examination report issued by the State Intellectual Property Office (SIPO) of the People's Republic of China in respect of Applicant's corresponding Chinese patent application.

Apr. 22, 2011 office action issued by the Korean Intellectual Property Office (KIPO) in respect of Applicant's corresponding Korean patent application.

* cited by examiner (y AXIS INTO PAGE)

(z AXIS INTO PAGE)

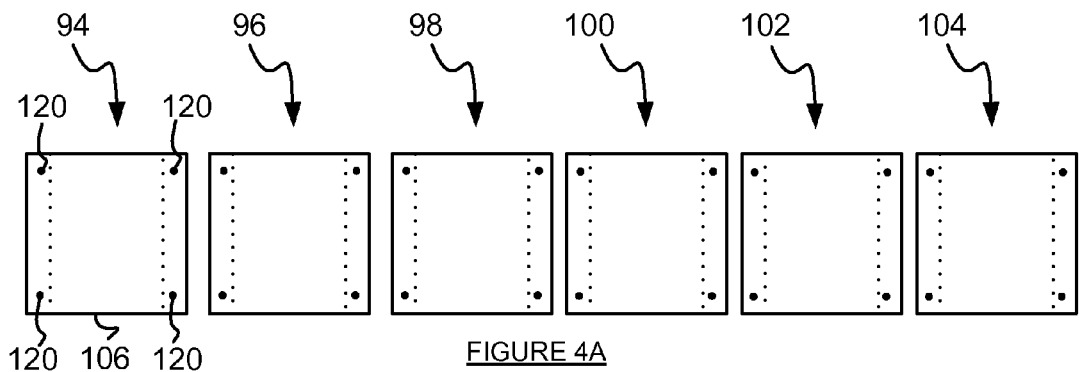
FIGURE 4A
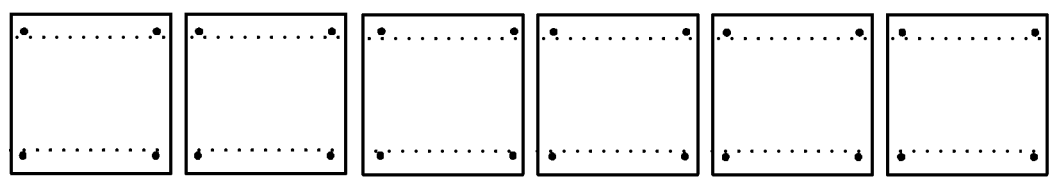
FIGURE 4B
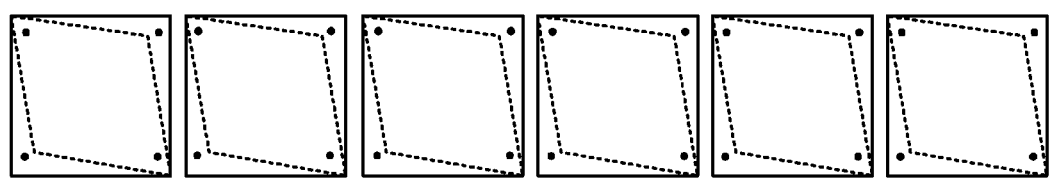
FIGURE 4C
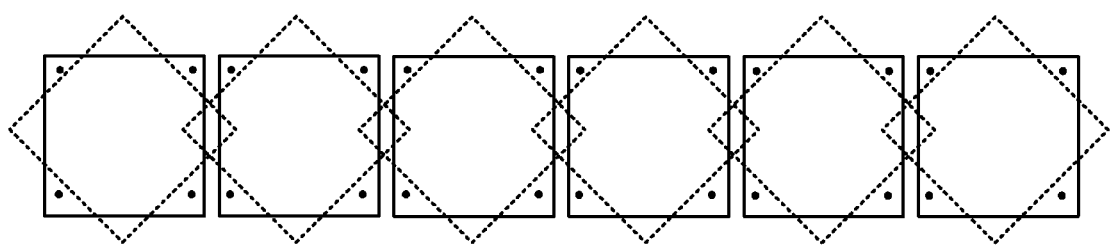
FIGURE 4D
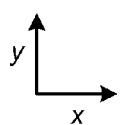
(z AXIS OUT OF PAGE)

ADAPTIVE SUNLIGHT REDIRECTOR

REFERENCE TO RELATED APPLICATION

This application claims the benefit of U.S. Provisional patent application Ser. No. 60/945,653 filed 22 Jun. 2007.

TECHNICAL FIELD

This disclosure concerns redirection of sunlight into a specific direction, regardless of the sun's position in the sky.

BACKGROUND

Building core daylight illumination systems would facilitate illumination of the core regions of a building with sunlight, thus reducing electrical lighting requirements and improving lighting quality. Widespread usage of building core daylight illumination systems in the most common workplace environment—substantially open-plan, multi-story office buildings—could significantly reduce energy consumption and greenhouse gas emissions. To foster their widespread usage, building core daylight illumination systems must be cost-effective. A cost-effective sunlight redirector for a building core daylight illumination system is disclosed below.

BRIEF DESCRIPTION OF DRAWINGS

FIG. 4A is a schematic top plan view of a 6-column portion of a columnar mirror array, with solid lines depicting the mirrors' neutral positions and dashed lines depicting rotation of the mirrors about the depicted y-axis.

FIG. 4B is similar to FIG. 4A, except the dashed lines depict rotation of the mirrors about the depicted x-axis.

FIG. 4C is similar to FIGS. 4A and 4B, except the dashed lines depict rotation of the mirrors about both of the depicted x and y axes.

FIG. 4D is similar to FIGS. 4A, 4B and 4C, except the dashed lines depict undesirable rotation of the mirrors about a z axis which is perpendicular to both of the depicted x and y axes.

DESCRIPTION

Throughout the following description, specific details are set forth in order to provide a more thorough understanding of the disclosure. In some instances, well known elements have not been shown or described in detail to avoid unnecessarily obscuring the disclosure. Accordingly, the specification and drawings are to be regarded in an illustrative, rather than a restrictive, sense.

Figure 1A:
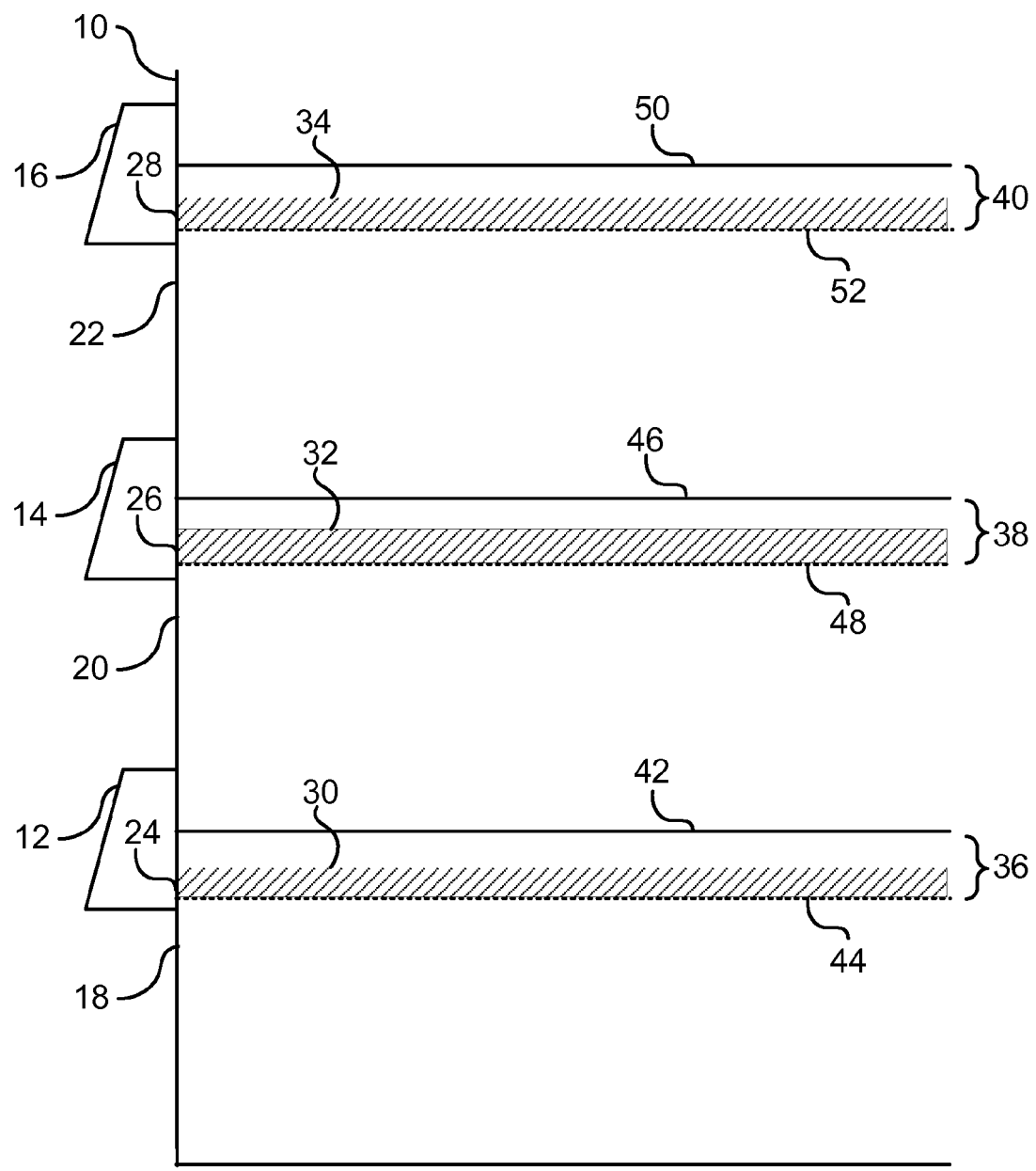
FIG. 1A is schematic, fragmented, side elevation view of a 3-story portion of a building having prior art solar canopies mounted above the building's windows along a south facade of the building.

FIG. 1A schematically depicts a 3-story portion of a building 10 with prior art solar canopies 12, 14, 16 mounted along a south facade of building 10 above windows 18, 20, 22 respectively. Each one of solar canopies 12, 14, 16 captures sunlight and redirects the sunlight through a corresponding one of weather-protected openings 24, 26, 28 in the exterior wall of building 10, and into a corresponding one of sunlight distributors (i.e. light guides) 30, 32, 34. Plenum spaces 36, 38, 40 are conventionally provided for each floor of building 10, i.e. plenum space 36 is provided between the first floor's ceiling 42 and drop ceiling 44, plenum space 38 is provided between the second floor's ceiling 46 and drop ceiling 48, and plenum space 40 is provided between the third floor's ceiling 50 and drop ceiling 52. Sunlight distributors 30, 32, 34 are provided within plenum spaces 36, 38, 40 respectively to distribute sunlight within building 10. Alternatively, instead of being invisibly recessed within a drop ceiling, the sunlight distributors could be incorporated in an exposed ceiling design similar to those in which ventilation ducts, etc. remain visible.

Figure 1B:
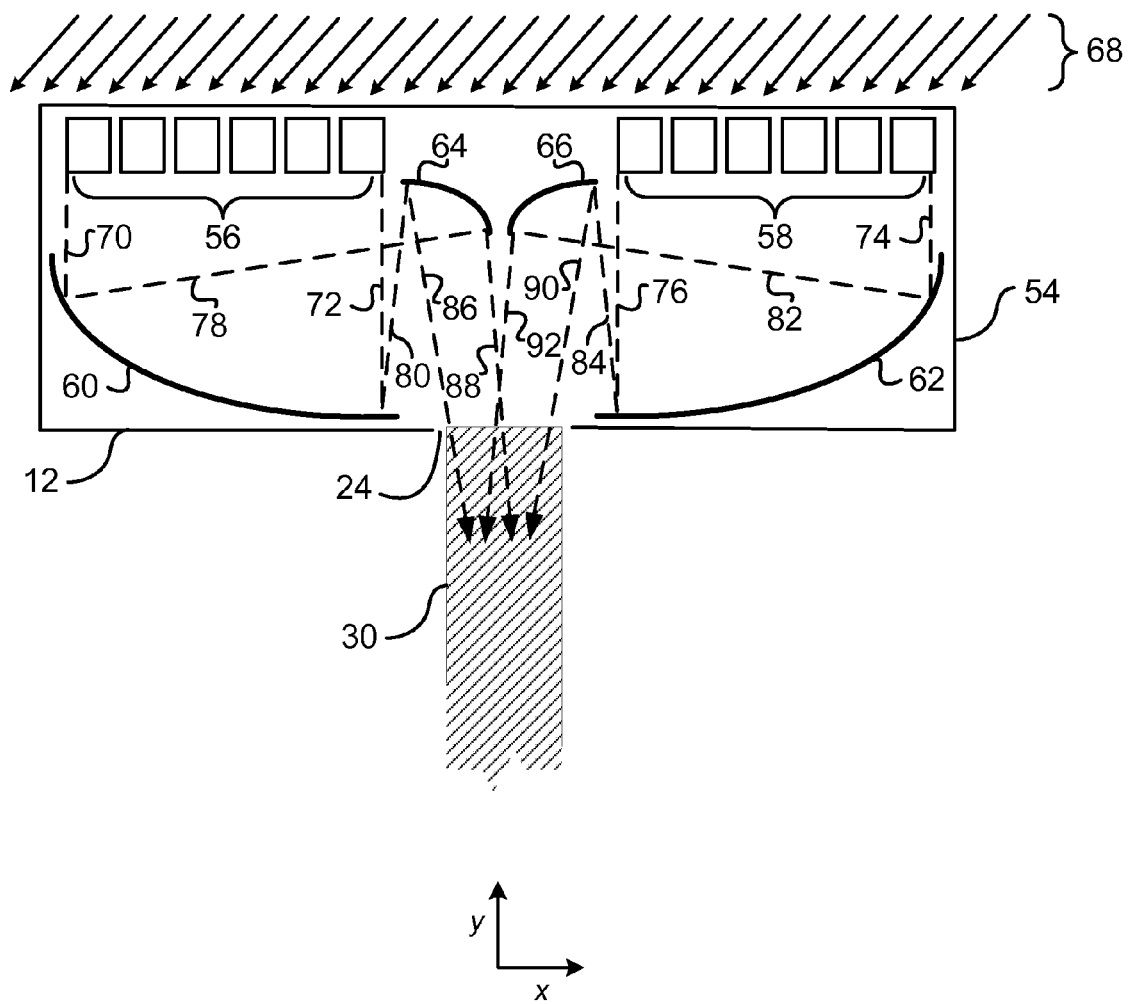
FIG. 1B is a partially fragmented schematic top plan view of one of the FIG. 1A solar canopies, showing the optical component configuration.

FIG. 1B schematically depicts an exemplary one of solar canopies 12, 14, 16; namely solar canopy 12 which houses optical and mechanical components within transparent cover 54. Cover 54 protects the components from wind, precipitation, dirt, etc., facilitates formation of the components from relatively inexpensive and lightweight materials, and reduces the components' maintenance requirements. Only sunlight-receiving portions of solar canopy 12 need be transparent; other portions thereof (e.g. side portions which never face the sun) may be opaque. The optical components housed within solar canopy 12 include sunlight redirecting mirror arrays 56, 58 and paraboloidal mirrors 60, 62, 64, 66. Mirror arrays 56, 58 reflect incident sunlight rays 68 toward paraboloidal mirrors 60, 62 respectively as indicated by dashed lines 70, 72 and 74, 76 respectively. Paraboloidal mirrors 60, 62 redirect the reflected rays toward paraboloidal mirrors 64, 66 respectively as indicated by dashed lines 78, 80 and 82, 84 respectively. Paraboloidal mirrors 64, 66 further redirect the reflected rays through wall opening 24 into sunlight distributor 30 as indicated by dashed lines 86, 88 and 90, 92 respectively. Paraboloidal mirrors 60, 62, 64, 66 are configured and oriented with respect to mirror arrays 56, 58 such that light rays are redirected into sunlight distributor 30 at an appropriate range of angles for transmission by sunlight distributor 30. This disclosure pertains to sunlight redirecting mirror arrays 56, 58; not to paraboloidal mirrors 60, 62, 64, 66 or sunlight distributor 30.

Figure 2A:
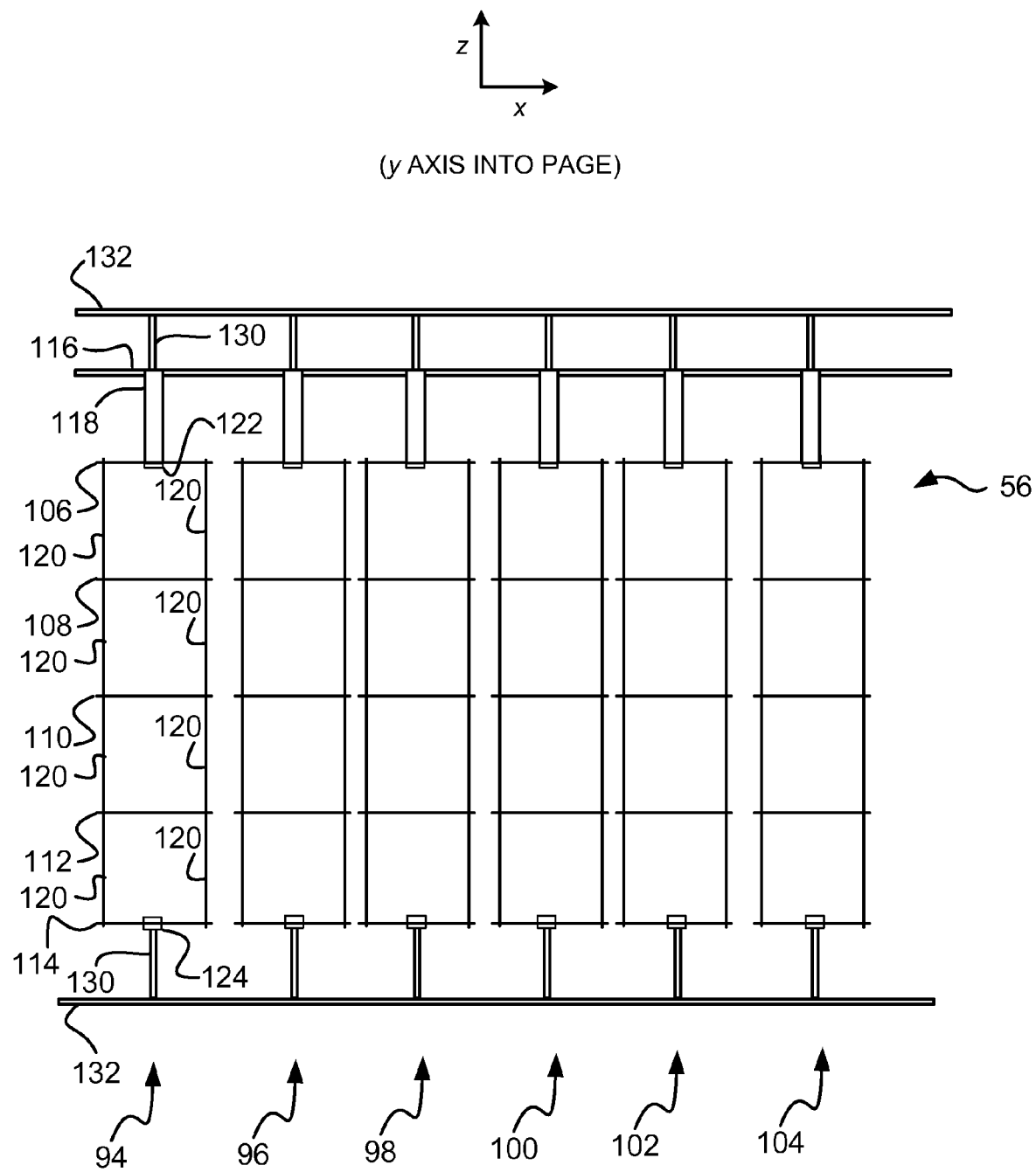
FIG. 2A is a front elevation schematic depiction of six columns of pivotally interconnected mirrors, depicting the mirrors in a neutral (non-rotated) position.
Figure 2B:
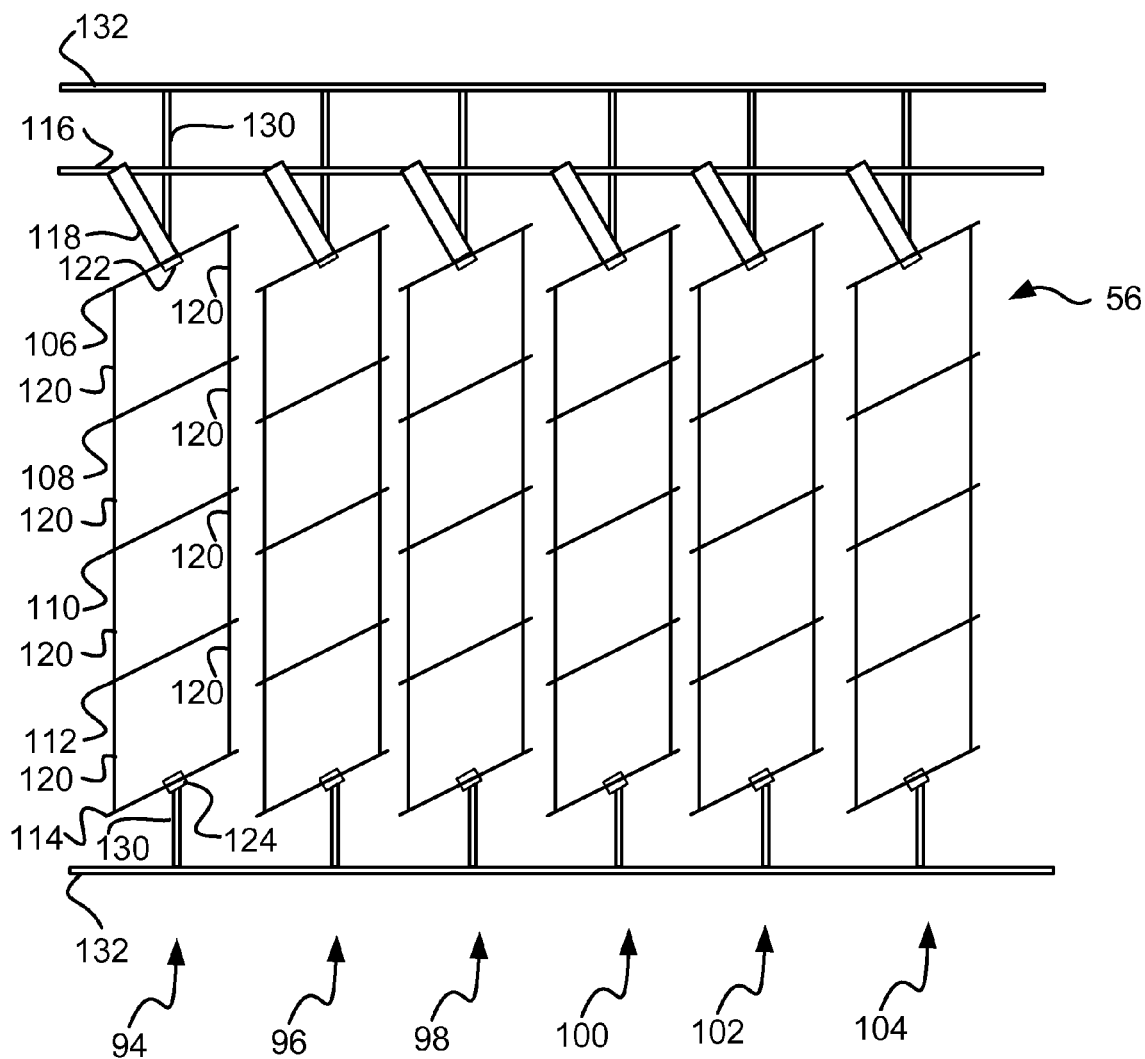
FIG. 2B is similar to FIG. 2A, except the mirrors are depicted in an azimuth-rotated position.
Figure 2C:
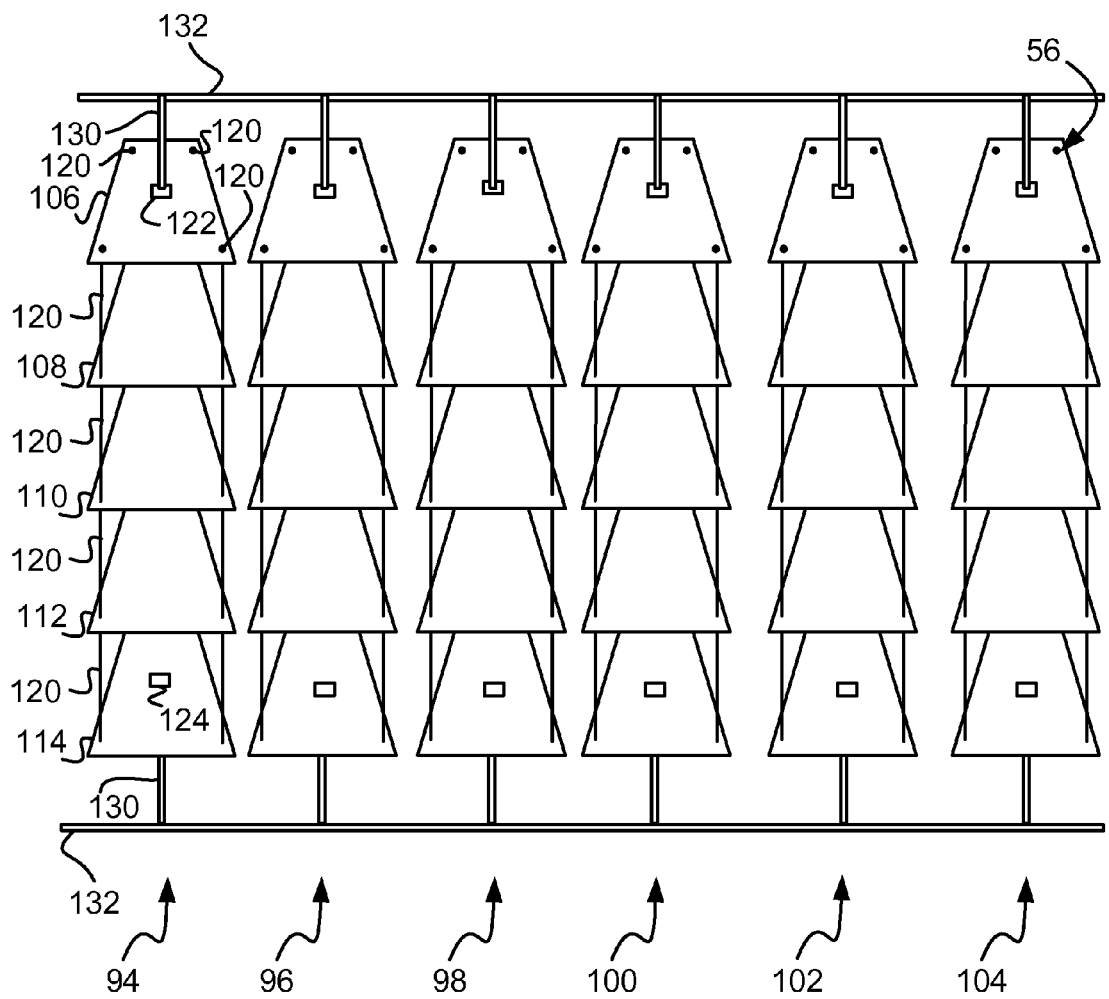
FIG. 2C is similar to FIGS. 2A and 2B, except the mirrors are depicted in an altitude-rotated position.
Figure 3A:
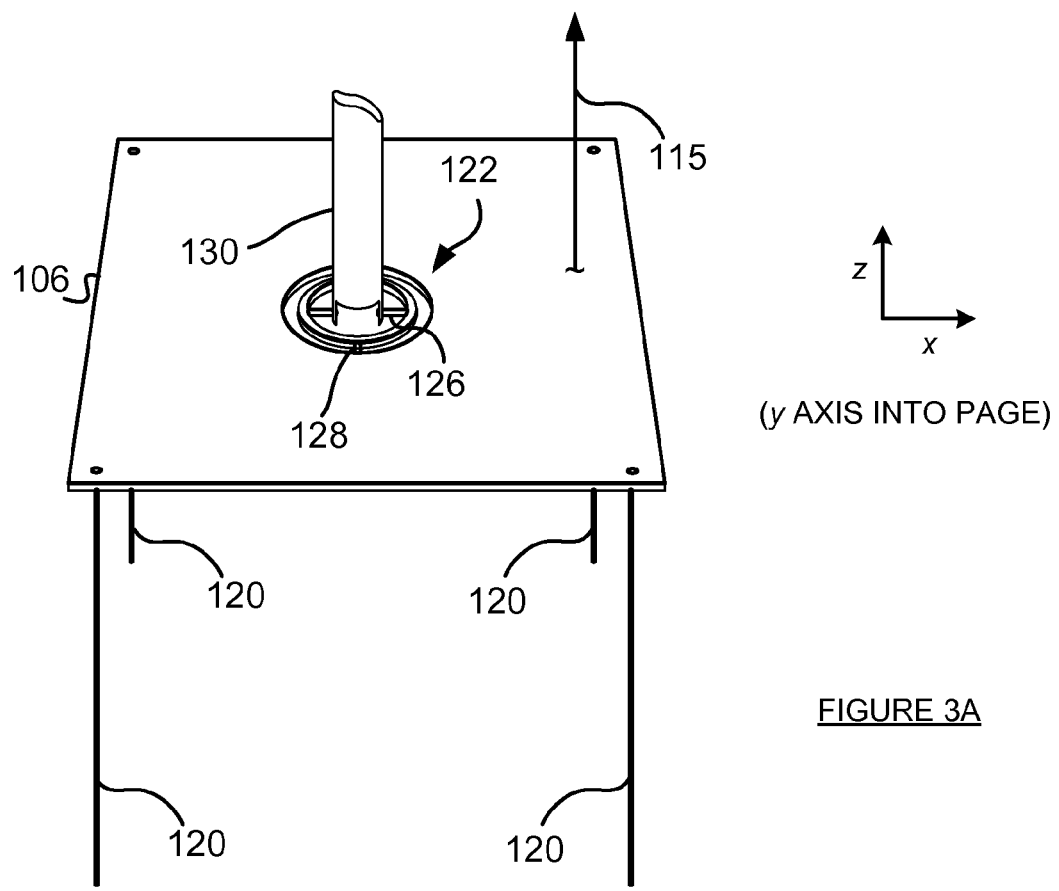
FIG. 3A is a top front oblique isometric illustration of a mirror and a universal joint.
Figure 3B:
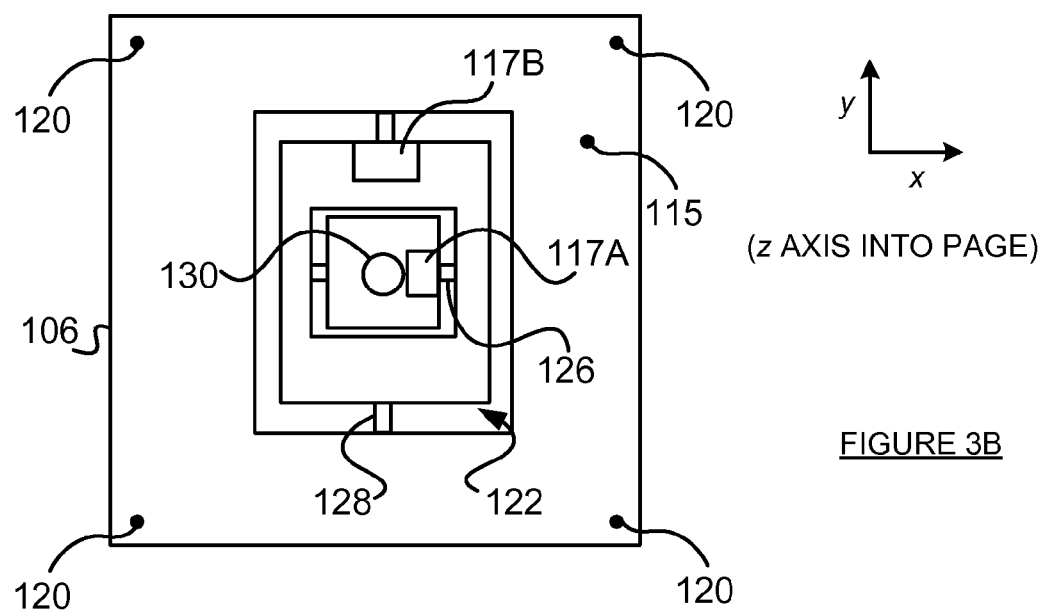
FIG. 3B is a top plan illustration of a mirror and universal joint like those of FIG. 3A, but with the universal joint shown schematically and showing two actuators coupled to the universal joint.

FIGS. 2A-2C schematically depict an exemplary one of mirror arrays 56, 58; namely mirror array 56, which has six columns 94, 96, 98, 100, 102, 104 of mirrors. Each column has five thin, rectangular, planar mirrors. For example, column 94 has five mirrors 106, 108, 110, 112, 114, etc. Each mirror has a notional surface normal vector 115 (FIGS. 3A and 3B). Mirror columns 94, 96, 98, 100, 102, 104 are pivotally connected to rigid rectangular first frame 116. Specifically, the uppermost mirror in each column (i.e. mirror 106 in column 94, etc.) is pivotally connected to first frame 116 by a pair of brackets, only one of which (i.e. bracket 118 in column 94, etc.) is visible in FIGS. 2A and 2B. Neither the brackets nor first frame 116 are shown in FIG. 2C to avoid obscuring other details. First frame 116 couples the columns of mirrors together so that all of the mirrors in array 56 move in unison.

The mirrors in each column are mechanically coupled together such that they can easily be rotated in two planes in order to adjust the mirrors' positions as the altitude and azimuth of the sun changes, without allowing the mirrors to interfere with (i.e. contact) one another as they move. The mirrors should not excessively shade one another as they move, although some minimal shading during relatively brief positions of the mirrors, the sun, or both, is acceptable to optimize overall efficiency of the sunlight redirector.

Each intermediate mirror in each column (i.e. mirrors 108, 110, 112 in column 94, etc.) is pivotally connected to the mirrors immediately above and below the intermediate mirror by linkages 120. Linkages 120 need not be rigid members, although they may be. Linkages 120 may be formed of a non-stretching material such as stainless steel wire. The opposed ends of each linkage 120 can be connected to the mirrors by ball joints, flexible elastomeric connectors, or other suitable means which permits the mirrors to pivot easily about the points at which linkages 120 are connected to the mirrors. If linkages 120 are not rigid, they should be held under sufficient tension (e.g. by adjusting the length of each linkage 120) that they behave as rigid members.

A universal joint (i.e. pivotable coupling) is provided in the center of the top and the bottom mirror in each column (i.e. universal joints 122, 124 are provided in mirrors 106, 114 respectively of column 94, etc.). Provision of two such universal joints per column allows the mirrors in each column to rotate about the depicted x and y axes which are perpendicular to the direction of longitudinal extent of the column, while preventing the mirrors from rotating about the z axis which is parallel to the direction of longitudinal extent of the column and perpendicular to the x and y axes.

FIGS. 3A and 3B show mirror 106 and universal joint 122 in greater detail. Universal joint 122 incorporates an x-axis rotational member 126 and a y-axis rotational member 128. One end of pivot link 130 is fixed to x-axis rotational member 126. The opposite end of pivot link 130 is fixed to an external second frame 132 (FIGS. 2A-2C) which is separate from and is not connected to first frame 116. As seen in FIGS. 2A-2C, one pivot link 130 extends upwardly from top mirror 106's universal joint 122 to an upper portion of second frame 132, and another pivot link 130 extends downwardly from bottom mirror 114's universal joint 124 to a lower portion of second frame 132, thereby securely bracing mirror column 94 to prevent rotation of the column 94 mirrors about the z axis. Although the universal joints are relatively inexpensive, they increase cost somewhat so it is desirable to provide them in only the top and bottom mirrors of each column. This is facilitated by linkages 120, which are less expensive than the universal joints, to facilitate pivotable movement of the intermediate mirrors.

First frame 116 may be coupled to any one of the mirrors in a column, provided the frame-coupled mirror in any column has the same columnar position relative to the frame-coupled mirrors in the other columns. For example, first frame 116 can be coupled, by the aforementioned brackets, to the top mirror in each column, or to the second mirror in each column, or to the bottom mirror in each column, etc. If the mirrors are interconnected as aforesaid, two inexpensive electronically controllable electro-mechanical rotational actuators (117A, 117B) can be used to smoothly move all of the mirrors in array 56 in unison, with very little torque. The two actuators can be provided on any one of the mirrors in which a universal joint is provided, as shown in FIG. 3B. Well known algorithms can be used to apply suitable control signals to the actuators, to cause predetermined angular displacement of the x and y-axis rotational members 126, 128 of the universal joint in the mirror on which the actuators are provided. Specifically, the actuators can be adaptively controlled to move the mirrors to track the sun, thereby continually redirecting sunlight into a specific direction (i.e. toward paraboloidal mirrors 60, 62, 64, 66 and thence into sunlight distributor 30), regardless of the sun's position—provided the sun is located within a predetermined angular range corresponding to about ±3 hours of true local solar noon (i.e. a significant part of a typical work day). Each sunlight redirecting mirror array 56, 58 is accordingly operative as a heliostat.

The solid lines in FIGS. 2A and 4A-4D show the mirrors in the neutral (non-rotated) position. FIG. 2B, and the dashed lines in FIG. 4A show the mirrors in an azimuth-rotated position, i.e. after suitable controlled operation of the actuators to rotate the mirrors about the depicted y-axis. FIG. 2C, and the dashed lines in FIG. 4B show the mirrors in an altitude-rotated position, i.e. after suitable controlled operation of the actuators to rotate the mirrors about the depicted x-axis. The dashed lines in FIG. 4C show the mirrors in an azimuth and altitude-rotated position, i.e. after suitable controlled operation of the actuators to rotate the mirrors about both of the depicted x and y axes. The dashed lines in FIG. 4D show how the mirrors would undesirably interfere with one another if they were not constrained, by the universal joints, to prevent them from rotating about the z axis (i.e. the axis which is perpendicular to both of the depicted x and y axes).

In operation, a light ray incident 68 on one side of one of mirror arrays 56, 58 is reflected once by one of the mirrors in that array and passes through to the opposite side of the array, as indicated by dashed lines 70, 72 and 74, 76 respectively in FIG. 1B. The actuators are controllably actuated to move the mirrors such that the mirrors' normal vectors are oriented, according to the law of specular reflection, such that incident light 68 is reflected into a preselected reflection direction.

Each mirror may be approximately 17×19 cm, although other sizes are acceptable. If the mirrors are too large, solar canopy 12 will extend too far off the side of building 10, which is architecturally undesirable. If the mirrors are too small, the cost of mirror array 56 may be excessive, which is also undesirable. The mirrors in each column should be spaced apart from one another such that the maximum amount of sunlight is captured, while minimizing shading of one mirror by the mirror above it. An array having six columns of seven mirrors per column, with each mirror approximately 17×19 cm in size, and with the mirrors in each column spaced about 12 cm apart, produces acceptable results. A 3 metre canopy (measured in the x direction shown in 1B) may house two such mirror arrays, as shown in FIG. 1B.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

For example, the actuators can be provided in an analogous mechanical arrangement coupled to first frame 116 and positioned adjacent mirror array 56.

The columnar mirrors within mirror arrays 56, 58 need not be vertically adjacent or vertically aligned with one another as shown in FIGS. 2A-2C. For example, the mirrors could be connected together in diagonally extending columns or other longitudinally extending columns. However linkages 120 should not be pivotally connected to the mirrors so as to permit the linkages to extend parallel to the planes of the mirrors for any position within the mirrors' intended angular operational range. For example, if the neutral position of the mirrors is horizontal, then the mirrors should not be connected in horizontal rows.

As another example, if the mirrors within mirror arrays 56, 58 are perfectly parallel to one another they will reflect sunlight as aforesaid, but they will not concentrate the sunlight—only paraboloidal mirrors 60, 62, 64, 66 will concentrate the sunlight. It is however possible to configure mirror arrays 56, 58 to contribute to concentration of the sunlight. This can be achieved by maintaining the plane of each mirror at a slight angle relative to the planes of the other mirrors, instead of maintaining the mirrors parallel to one another. More particularly, the actuators can be controlled to move the mirrors such that the orientation of each mirror's normal vector deviates slightly from that of the other mirrors. Consequently, according to the law of reflection, incident light 68 is reflected into directions which deviate slightly from a preselected reflection direction. The deviation of each mirror's normal vector should be large enough to produce a preselected pattern in the reflected light. Appropriate selection of the deviation of each mirror's normal vector facilitates some concentration (i.e. focusing) of the sunlight as it is redirected toward paraboloidal mirrors 60, 62, 64, 66. This reduces the degree of sunlight concentration required of paraboloidal mirrors 60, 62, 64, 66 thereby reducing the optical quality—and hence cost—of paraboloidal mirrors 60, 62, 64, 66.

The deviation of each mirror's normal vector should however be limited, since if the deviation is too great adjacent mirrors may interfere with (i.e. contact or excessively shade) one another as they are moved to track the sun, particularly at extreme azimuth or altitude angles. This can be alleviated by increasing the spacing between adjacent mirrors and columns of mirrors, but at the expense of reduced efficiency since some light would pass through the increased spacing between adjacent mirrors without being reflected by the mirrors and hence be lost in the sense that such light would not be distributed within building 10.

What is claimed is:

1. A sunlight redirector, comprising:
    an array of plane mirrors, each mirror having a surface normal vector;
    non-stretching linkages pivotally interconnecting longitudinally adjacent ones of the mirrors and constraining movement of the mirrors such that the normal vectors remain parallel while the mirrors move;
    a first pivotable coupling in a first one of the longitudinally adjacent mirrors; and
    a second pivotable coupling in a second one of the longitudinally adjacent mirrors;
    the first and second pivotable couplings permitting the first and second mirrors to move with respect to either one of two mutually perpendicular axes and preventing movement of the first and second mirrors with respect to a third axis;
    wherein:
    the first and second pivotable couplings are first and second universal joints each having a first member rotatable with respect to a first one of the two mutually perpendicular axes, and a second member rotatable with respect to a second one of the two mutually perpendicular axes;
    the first mirror surrounds and pivots on the first member of the first universal joint; and
    the second mirror surrounds and pivots on the first member of the second universal joint.

2. A sunlight redirector as defined in claim 1, wherein:
    the mirrors are arranged in a plurality of columns; and
    the non-stretching linkages connect each mirror to an adjacent mirror in the same column.

3. A sunlight redirector as defined in claim 2, wherein the third axis is perpendicular to the two mutually perpendicular axes and parallel to a direction of longitudinal extent of the columns.

4. A sunlight redirector as defined in claim 2, further comprising:
    a first frame pivotally coupled to one mirror in each one of the columns;
    in each one of the columns;
        a first pivot link coupled between a second frame and one pivotable coupling in one mirror; and
        a second pivot link coupled between the second frame and another pivotable coupling in another mirror;
    wherein a mirror in any column coupled to the first frame has the same columnar position as a mirror in any other column coupled to the first frame.

5. A sunlight redirector as defined in claim 2, operative as a heliostat and wherein:
    the first and second pivotable couplings are first and second universal joints each having a first member rotatable with respect to a first one of the two mutually perpendicular axes, and a second member rotatable with respect to a second one of the two mutually perpendicular axes;
    the first mirror surrounds and pivots on the first member of the first universal joint; and
    the second mirror surrounds and pivots on the first member of the second universal joint.

6. A sunlight redirector as defined in claim 2, further comprising:
    a first frame pivotally coupled to one mirror in each column;
    in each one of the columns:
        a first pivot link coupled between a second frame and one pivotable coupling in one mirror; and
        a second pivot link coupled between the second frame and another pivotable coupling in another mirror.

7. A sunlight redirector as defined in claim 1, further comprising:
    a first electronically controllable actuator coupled to one of the pivotable couplings to controllably move a selected one of the mirrors with respect to a first one of the two mutually perpendicular axes; and
    a second electronically controllable actuator coupled to the one of the pivotable couplings to controllably move the selected one of the mirrors with respect to a second one of the two mutually perpendicular axes;
    and wherein:
    a light ray incident on one side of the array is reflected once by one of the mirrors through an opposite side of the array; and
    the actuators are controllable to move the mirrors to orient the normal vectors such that the mirrors specularly reflect incident light in a preselected direction.

8. A sunlight redirector as defined in claim 1, further comprising:
    a first electronically controllable actuator coupled to one of the pivotable couplings to controllably move a selected one of the mirrors with respect to a first one of the two mutually perpendicular axes; and
    a second electronically controllable actuator coupled to the one of the pivotable couplings to controllably move the selected one of the mirrors with respect to a second one of the two mutually perpendicular axes.

9. A sunlight redirector as defined in claim 8, wherein:
the first and second pivotable couplings are first and second universal joints each having a first member rotatable with respect to a first one of the two mutually perpendicular axes, and a second member rotatable with respect to a second one of the two mutually perpendicular axes;
the first mirror surrounds and pivots on the first member of the first universal joint; and
the second mirror surrounds and pivots on the first member of the second universal joint.

10. A sunlight redirector as defined in claim 9, wherein:
a light ray incident on one side of the array is reflected once by one of the mirrors through an opposite side of the array; and
the actuators are controllable to move the mirrors to orient the normal vectors such that the mirrors specularly reflect incident light in a preselected direction.

11. A sunlight redirector as defined in claim 8, wherein:
the mirrors are arranged in a plurality of columns; and
the non-stretching linkages connect each mirror to an adjacent mirror in the same column.

12. A sunlight redirector as defined in claim 11, wherein:
the first and second pivotable couplings are first and second universal joints each having a first member rotatable with respect to a first one of the two mutually perpendicular axes, and a second member rotatable with respect to a second one of the two mutually perpendicular axes;
the first mirror surrounds and pivots on the first member of the first universal joint; and
the second mirror surrounds and pivots on the first member of the second universal joint.

13. A sunlight redirector as defined in claim 1, operative as a heliostat.

* * * * *